United States Patent
Barua et al.

(10) Patent No.: US 6,177,772 B1
(45) Date of Patent: Jan. 23, 2001

(54) METHOD AND APPARATUS FOR BRAKING A POLYPHASE DC MOTOR

(75) Inventors: Shaibal Barua, Dallas; William R. Krenik, Garland, both of TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 09/211,946

(22) Filed: Dec. 15, 1998

Related U.S. Application Data

(60) Provisional application No. 60/070,158, filed on Dec. 31, 1997.

(51) Int. Cl.[7] ............................... H02K 7/10; H02P 3/00
(52) U.S. Cl. ......................... 318/362; 318/757; 318/759; 318/375
(58) Field of Search ..................... 318/757–759, 318/362, 368, 369, 375, 459, 366

(56) References Cited

U.S. PATENT DOCUMENTS

| | | | |
|---|---|---|---|
| 4,658,308 | * | 4/1987 | Sander, Jr. ............... 360/74.1 |
| 5,504,402 | * | 4/1996 | Menegoli ................. 318/377 |
| 6,005,359 | * | 12/1999 | Brambilla et al. ........... 318/368 |

FOREIGN PATENT DOCUMENTS

| | | |
|---|---|---|
| 0 441 030 A2 | 8/1991 | (EP) . |
| 0 884 727 A2 | 12/1998 | (EP) . |
| 9-23688 | 1/1997 | (JP) . |

* cited by examiner

Primary Examiner—Karen Masih
Assistant Examiner—Marlon Fletcher
(74) Attorney, Agent, or Firm—W. Daniel Swayze, Jr.; Wade James Brady, III; Frederick J. Telecky, Jr.

(57) ABSTRACT

A circuit and method for braking a disk drive when a power fault occurs has a circuit (10) for producing an output signal (28) indicating that the motor of the disk drive has slowed at least to a predetermined rotational speed after the occurrence of the power fault. The components of the circuit (10) may be integrated onto the same integrated circuit as the motor driving circuitry or head retract circuitry. During the time between the occurrence of the power fault and the time the disk drive has slowed to the predetermined rotational speed, the read/write head mechanism (17) is retracted. A braking circuit then brakes the disk drive when the output signal (28) indicates that the motor has slowed, at least to the predetermined rotational speed. The circuit for producing an output signal indicating that the motor has slowed at least to the predetermined rotational speed is actuated by the back-emf (14) generated by the motor failing below a predetermined level.

6 Claims, 1 Drawing Sheet

METHOD AND APPARATUS FOR BRAKING A POLYPHASE DC MOTOR

This application claims benefit of Provisional application Ser. No. 60/070,158, filed Dec. 31, 1997.

BACKGROUND OF THE INVENTION

1. Field of the Invention

This invention relates to improvements in methods and apparatuses for use in conjunction with hard disk drives of the type used in computer related applications, and more particularly to improvements and methods for use in braking such drives upon the occurrence of a power fault, or the like, and still more particularly to improvements in methods and apparatuses for braking the spindle of the motor of the drive after a delayed time sufficient to enable the read/write heads of the disk drive to be properly retracted.

2. Relevant Background

In the operation of hard disk drives, for example, in computer applications, certain protocols are often employed to control the braking of the motor which spins the disk drive. In usual operation, a hard disk drive has one or more heads, which record and/or read magnetic fields that represent data in a known manner onto a recording media on one or more rotating disks of the disk drive. The heads are positionable to precise radial locations by a "voice coil motor", which controls the movement of arms on which the heads are carried. When the disk is at rest, the heads normally ride just resting on the disk; however, when the disk is spinning, air forces generated between the disk and the heads cause the heads to float a small distance above the magnetic media.

Thus, when the rotation of the disk drive is stopped, the air force also stops, allowing the heads to fall into contact with the magnetic media. If the heads come into contact with the media while there is still some movement of the media, wear or damage may result, both to the recorded area on the media and to the heads.

Consequently, means have been proposed to position the heads over a "landing strip" portion of the disk, so that only that strip is damaged by a head falling onto the disk. Nevertheless, it will be appreciated that repeated contact between the disk and head will eventually wear upon the head, as well. Some manufacturers, in fact, recommend a computer not be powered down to avoid the type of damage that such contact causes.

Once the heads are in place and the disk drive is powered down, it is sometimes possible for the head mechanism, which is now in contact with the disk media, to move if the computer is moved, for example, as would be anticipated in portable or laptop type computers. Consequently, some manufacturers also provide for a locking mechanism, usually mechanical in construction, to hold the heads in a landed position over the landing strip. Some types of such locking mechanisms require an extra bit of electrical energy, just as the head reaches the landing position to overcome the mechanical restraint to bring the heads into their locked position.

In the event of a loss of power, to prevent the heads from landing on portions of the magnetic media other than the designated landing pad, often when a power failure is detected, the motor spinning the disk is allowed to continue to turn under the inertia of the various masses of the drive. As a result, the motor coils generate their own counter- or back-emf. The coils of the spinning motor are then connected to deliver the voltages generated by the counter-emf produced in the motor windings to operate circuitry and to provide the energy to the voice coils necessary to drive the heads to the landing strip.

Once the heads are positioned over the landing strip, the motor is then braked to stop its rotation as rapidly as possible, so that the time in which the head may contact the disk is minimized. Such braking, of course, requires additional energy. It can therefore be seen that design considerations need to be implemented to insure that a sufficient amount of energy is generated to move the heads completely to the landing strip, including the locking position, if necessary, to avoid a premature landing on an unwanted portion of the disk media. During this landing period, sufficient rotational speed of the motor must be provided to ensure a sufficient air flow to maintain the vertical position of the heads over the disk media.

However, once the heads are properly positioned, the motor must be rapidly stopped. This is ordinarily done by grounding sets of the driver transistors (or connecting them to a particular potential, such as $V_{CC}$). This causes the magnetic fields generated in the motor windings by the free-spinning rotor to resist its rotation, which rapidly brings the disk to a stop. However, if the disk is stopped too soon, the heads may not reach their landing strip position, which may result in undue skidding of the heads on the surface of the disk. On the other hand, if the driver transistors are shorted while the motor is still spinning too rapidly, excessive currents can be generated in the driver transistors, which may burn them out.

In the past, in order to coordinate the motor braking with the retract positioning of the heads, as the motor lost speed, for instance if a power fault occurred, its slowing speed was estimated using an RC circuit. In such circuit, the capacitor began its discharge upon loss of power. When the voltage discharged to a predetermined level, a braking circuit was activated. However, such RC circuits generally require relatively large components, since the braking time is relatively long, for example, on the order of seconds. Such components were provided off-chip, that is, were not included on the integrated circuit chip on which the remaining of the driver circuitry to position and control the head mechanism.

What is needed, therefore, is a method and apparatus for braking a disk of a hard disk drive, or the like, using components that may be located on the same integrated circuit chip as the motor driver circuitry or circuitry to position and control the head mechanism, and which controls the retract operation of the head mechanism in response to the actual slowing speed of the motor.

SUMMARY OF THE INVENTION

In light of the above, therefore, it is an object of the invention to provide a method and apparatus for braking a disk of a hard disk drive, or the like.

It is another object of the invention to provide a method and apparatus of the type described to detect the rotational velocity of the disk and to initiate a head retraction when the disk slows below a predetermined rotational velocity.

It is still another object of the invention to provide a method and apparatus of the type described that uses components that may be located on the same integrated circuit chip that contains the driver circuitry for the motor driver or for positioning the head mechanism.

These and other objects, features and advantages of the invention will be apparent to those skilled in the art from the following detailed description, when read in conjunction with the accompanying drawings and appended claims.

According to a broad aspect of this invention, a circuit is provided for braking a disk of a hard disk drive of the type used in computer applications, or the like. The circuit includes a circuit for producing an output signal indicating that the disk has slowed at least to a predetermined actual rotational speed, and a braking circuit to brake a motor of the drive when the output signal indicates that the disk has slowed at least to the predetermined actual rotational speed. The circuit for producing an output signal indicating that the disk has slowed at least to an actual rotational speed and the braking circuit may be actuated by a back-emf generated by the motor when power is disconnected from the motor.

In accordance with still another broad aspect of the invention, a circuit for braking a disk drive when a power fault occurs is presented. The circuit includes a circuit for presenting a predetermined reference voltage. A circuit is provided for comparing the predetermined reference voltage with a bemf voltage produced by a motor of the disk drive for producing a signal to initiate a brake operation of the motor of the disk drive when the bemf voltage falls below a predetermined voltage level with reference to the predetermined reference voltage. A circuit is also provided for retracting a head mechanism of the disk drive upon the occurrence of the power fault before the bemf voltage falls below the predetermined reference voltage.

The circuit for presenting a predetermined reference voltage in one embodiment includes a capacitor and a transistor. The transistor is connected to charge the capacitor to a predetermined reference voltage from a reference voltage source when the disk drive is operating normally, and to isolate the capacitor when a power fault occurs. The capacitor is sized such that the time required for the bemf to fall below the predetermined voltage level with reference to the predetermined reference voltage is sufficient for the circuit for retracting the head mechanism to move the head mechanism to a predetermined location.

BRIEF DESCRIPTION OF THE DRAWING

A preferred embodiment of the invention is illustrated in the accompanying drawing in which.

DETAILED DESCRIPTION OF THE PREFERRED EMBODIMENTS

Figure 1:
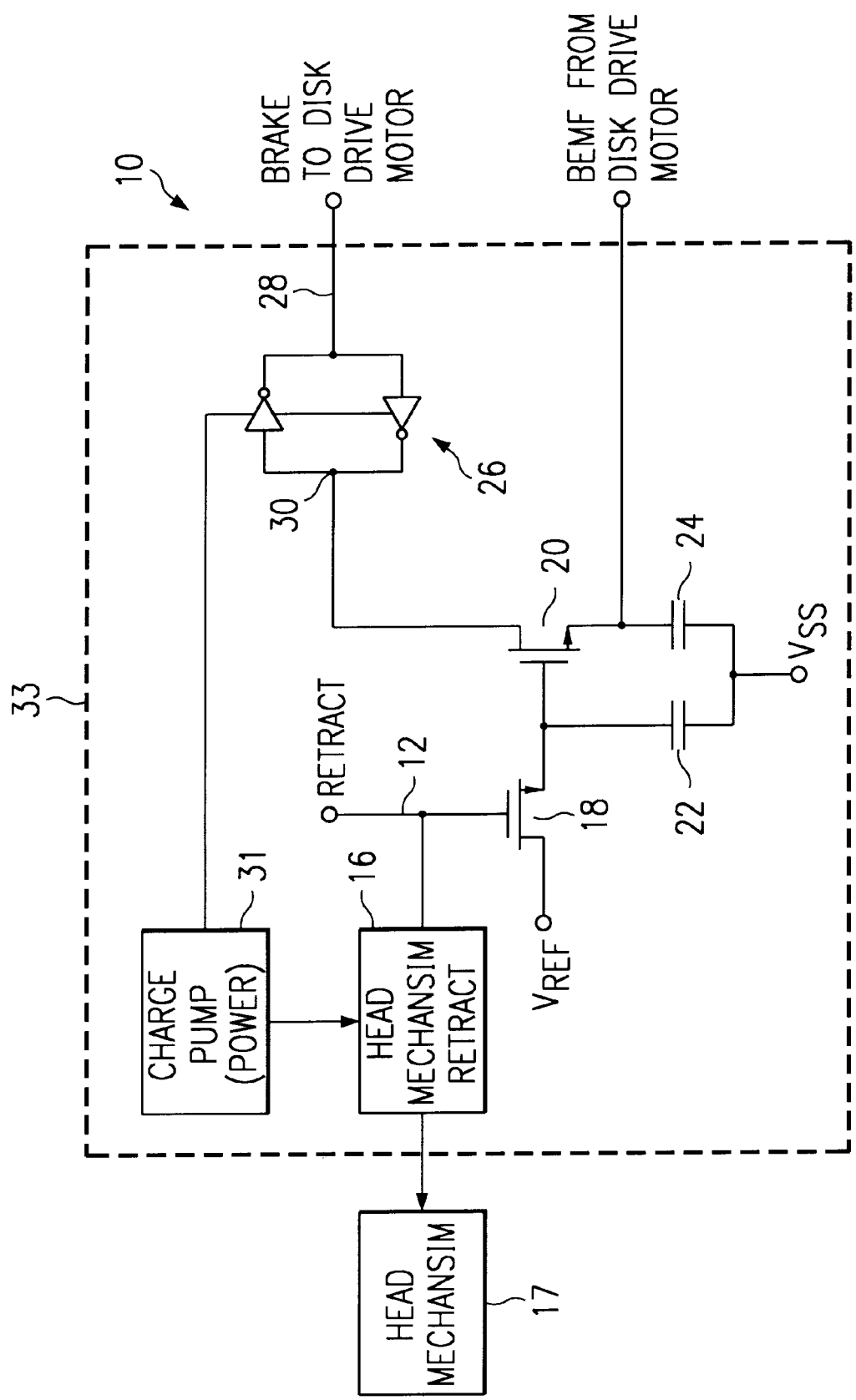
FIG. 1 is an electrical schematic diagram showing an embodiment of a breaking circuit used in conjunction with a disk drive of the type used in computer applications or the like, in accordance with a preferred embodiment of the invention.

It should be noted that the process steps and structures herein described do not necessarily form a complete polyphase dc motor, hard disk drive, disk drive driver circuitry, or control circuitry therefor. It is anticipated that the present invention may be practiced in conjunction with disk drive apparatuses and control circuitry currently used in the art, and only so much of the commonly practiced apparatus and process steps are included as are necessary for an understanding of the present invention.

The purpose of this method of the invention is to detect the bemf signal from the motor when it reaches and goes below a predetermined voltage level during a power fault condition, and to then generate a brake signal to brake the spindle motor. During the interval in which the bemf falls from its normal operating level to below the predetermined voltage level, the retract of the head mechanism is initiated, beginning as soon as a power fault is detected, and finishing when the magnitude of the bemf signal falls below the predetermined level.

Thus, in contrast to the previous techniques that use fixed external resistors and capacitors to establish the time constant prior to initiating the disk braking function, to enable the required retract time of the actuator to elapse, the present invention requires no external components. The method of the invention further uses the bemf signal, which is a direct indicator of the rotational speed of the spindle, to determine the retract time before the brake signal is generated.

The technique for producing a delayed disk brake operation, according to a preferred embodiment of the invention, is accomplished by a circuit 10, as shown in FIG. 1. The circuit 10 is connected to receive a RETRACT signal on line 12 and a Back EMF (bemf) signal on a line 14. The RETRACT signal is provided by control circuitry to an associated disk drive (not shown), and the bemf is derived from the disk drive motor (not shown). RETRACT and bemf signals are well known in the art.

The RETRACT signal on line 12 is connected to control head mechanism RETRACT circuit 16 in a known manner which, when the RETRACT signal changes state, the head mechanism RETRACT circuitry operates to move the read/write head assembly 17 from its then current position to a parked position, or other desired location. As is known, the RETRACT signal changes state upon the occurrence of a power fault, which may be, for example, a power disconnect, temporary power hiatus, or other such power discontinuity.

The line 12 on which the RETRACT signal exists is connected to the gate of a first NMOS transistor 18, to the drain of which a reference voltage $V_{REF}$ is applied. The source of the NMOS transistor 18 is connected to the gate of a second NMOS transistor 20. A storage capacitor 22 is connected between the gate of the NMOS transistor 20 and a reference potential, such as $V_{SS}$, or ground.

On the other hand, a filter capacitor 24 is connected between the source of the NMOS transistor 20 and the reference potential $V_{SS}$. The drain of the NMOS transistor is connected to one side of a latch 26. The other side of the latch 26 provides the delayed brake signal on line 28.

In operation, storage capacitor 22 is sized to present the voltage to which it is charged ($V_{REF}$) onto the gate of the NMOS device 20, and may be, for example, about 50 pf. Capacitor 24 is sized to smooth out any high frequency spikes that may exist on the bemf signal on line 14, and the reference voltage, $V_{REF}$, is established to equal to the desired bemf detection voltage minus a Schottky diode drop, as described below.

The NMOS device 18 acts as a sampling switch during normal operation of the motor of the associated hard disk drive. The signal RETRACT is high during normal operation, so that during normal operation, the storage capacitor is charged to $V_{REF}$.

The NMOS device 20 detects the difference between the voltages at its gate and source, and when the difference is more than the threshold voltage, the NMOS 20 turns on and pulls down node 30, which activates the latch 26, forcing the BRAKE signal on line 28 to go high to brake the motor of the disk drive.

The retract circuit 16 and latch 26 powered by a charge pump voltage (i.e. 10V for 5V motor) 31, so in the case of a power fault, the head mechanism retract circuit 116 and latch 26 will still continue to function. Thus, during a power fault, the head mechanism retract circuit 16 will immediately initiate movement of the head mechanism to its desired power off location.

During normal operation of the system, the signal, RETRACT, on line 12 is high, transistor 18 is on, and a predetermined voltage is applied across the capacitor 22 to charge it to the reference voltage $V_{REF}$. At this point, the NMOS device 20 will be off, since its source voltage (the bemf voltage minus a diode drop) is higher than the predetermined gate reference voltage ($V_{REF}$) minus the gate-source voltage of the NMOS.

However, upon the occurrence of a power fault, the signal, RETRACT, goes low. This initiates the retract operation of the head retract mechanism 16, and turns off the NMOS device 18. This holds the voltage across the capacitor 22 to its charged value, as the only discharge path to the charge on the capacitor 22 is the leakage from the reversed biased pn junction of the transistor 18. In addition, during the power fault, the bemf voltage of the motor starts to fall off. When the bemf reaches a voltage below the predetermined voltage by the turn on voltage of the NMOS device 20, the NMOS device 20 sets the latch 26, which generates the brake signal for the spindle of the motor of the disk drive. Thus, the predetermined reference voltage, $V_{REF}$, is chosen in such a way that there is sufficient time for the retract of the head mechanism to be completed before the brake signal for the spindle is generated.

It will be appreciated that the circuit 10 may be integrated onto the same integrated circuit 33 as the circuitry of the motor driver circuitry, not shown, and/or the head mechanism retract circuitry 16, without the heretofore required large external capacitors and other components.

Although the invention has been described and illustrated with a certain degree of particularity, it is understood that the present disclosure has been made only by Nay of example, and that numerous changes in the combination and arrangement of parts can be resorted to by those skilled in the art without departing from the spirit and scope of the invention, as hereinafter claimed.

What is claimed is:

1. A method for braking a disk drive, comprising:
    generating a first voltage indicating a spinning velocity of a motor of the drive;
    maintaining a second voltage on a capacitor integrated onto an integrated circuit chip containing at least driving circuitry for a head mechanism associated with said motor;
    comparing the first voltage to the second voltage; and
    if as a result of said comparing, said second voltage is determined to be less than said first voltage, activating a braking circuit to stop said spinning velocity of said motor.

2. The method of claim 1 wherein said step of generating a first voltage indicating a spinning velocity of the motor comprises detecting a back emf signal generated by said motor.

3. The method of claim 2 further comprising establishing said second voltage at a value which provides a time delay for a decay of said first voltage on said capacitor before said first and second voltages are equal to define a retract time during which said head mechanism can be moved to a parked position.

4. A circuit for braking a disk drive when a power fault occurs, comprising:
    a circuit for presenting a predetermined reference voltage;
    a circuit for comparing the predetermined reference voltage with a bemf voltage produced by a motor of the disk drive for producing a signal to initiate a brake operation of the motor of the disk drive when the bemf voltage falls below a predetermined voltage level with reference to said predetermined reference voltage; and
    a circuit for retracting a head mechanism of the disk drive upon the occurrence of the power fault before the bemf voltage falls below the predetermined reference voltage.

5. The circuit of claim 4 wherein said a circuit for presenting a predetermined reference voltage comprises a capacitor and a transistor, said transistor being connected to charge said capacitor to a predetermined reference voltage from a reference voltage source when the disk drive is operating normally, and to isolate said capacitor when a power fault occurs.

6. The circuit of claim 5 wherein said capacitor is sized such that the time required for the bemf to fall below said predetermined voltage level with reference to said predetermined reference voltage is sufficient for said circuit for retracting the head mechanism to move said head mechanism to a predetermined location.

* * * * *